Inventors
ROGER STRANGE WADDINGTON
BRUCE DUVAL
By Jacoby & Jacoby
Attorneys

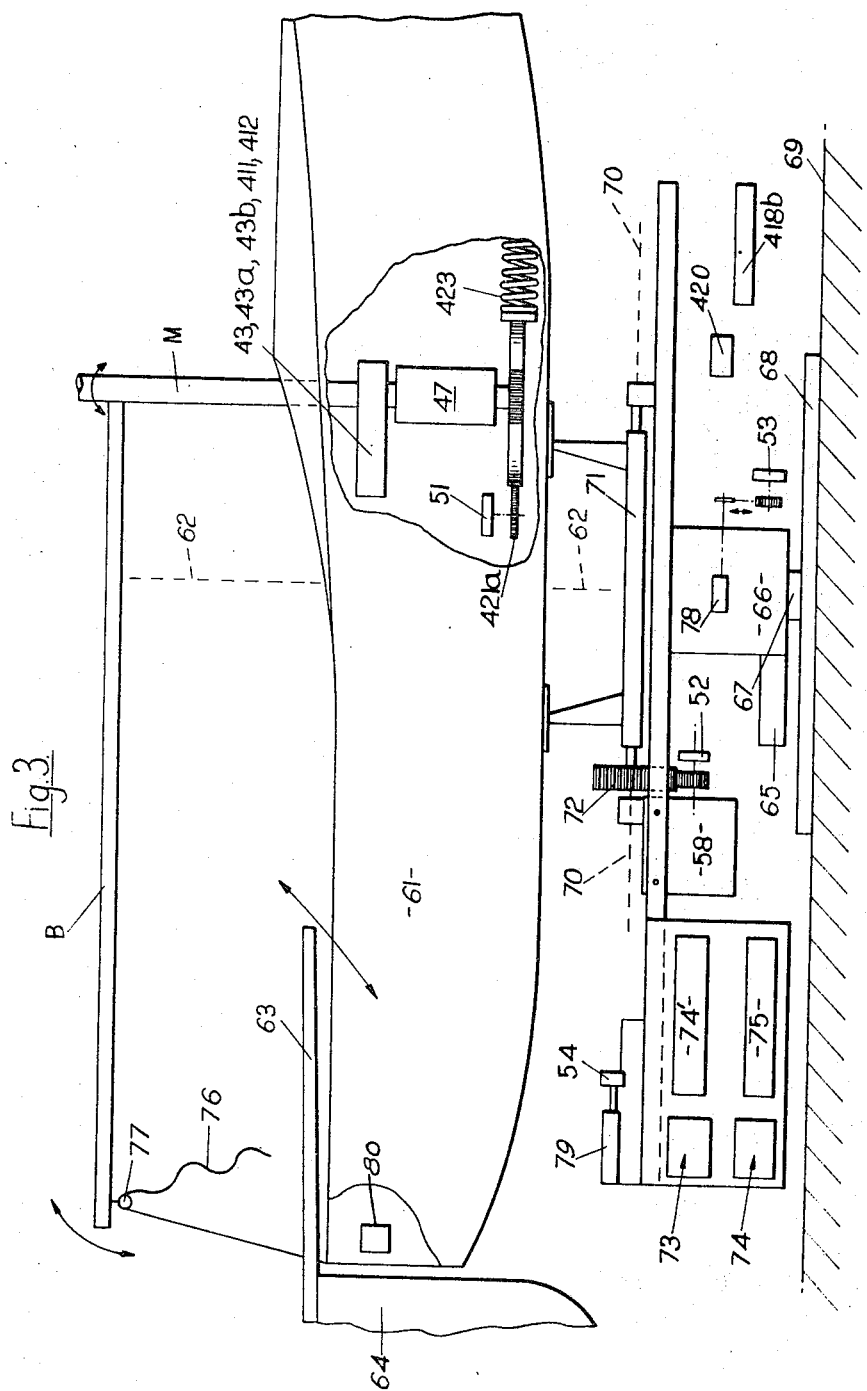

United States Patent Office 3,540,134
Patented Nov. 17, 1970

3,540,134
TRAINING DEVICES
Rogor S. Waddington and Bruce Duval, Lausanne, Switzerland, assignors to T.P.I. Limited, Nassau, Bahamas, a Bahamian company
Filed Dec. 28, 1967, Ser. No. 694,314
Int. Cl. G09b 9/06
U.S. Cl. 35—11                                6 Claims

ABSTRACT OF THE DISCLOSURE

With a sailing simulator for teaching a pupil to sail on dry land conditions in a fixed hull which is rotationally responsive to a tiller for turning movement and has a heeling motion which is dependent upon the instantaneous direction of the supposed wind, it is advantageous to provide a boom controlled by a mainsheet which gives the pupil a natural feel and which alters the heeling angle realistically. In accordance with this invention, an actuator for the boom has its body rotatable by the boom against resilient means. The rotation of the boom by the actuator is dependent upon a signal representative of the supposed wind direction and a transmitter connected to the actuator body transmits a signal representative of the angular portion of the body. The signal may be applied to regulate the heeling angle of the hull.

---

Figure 2:
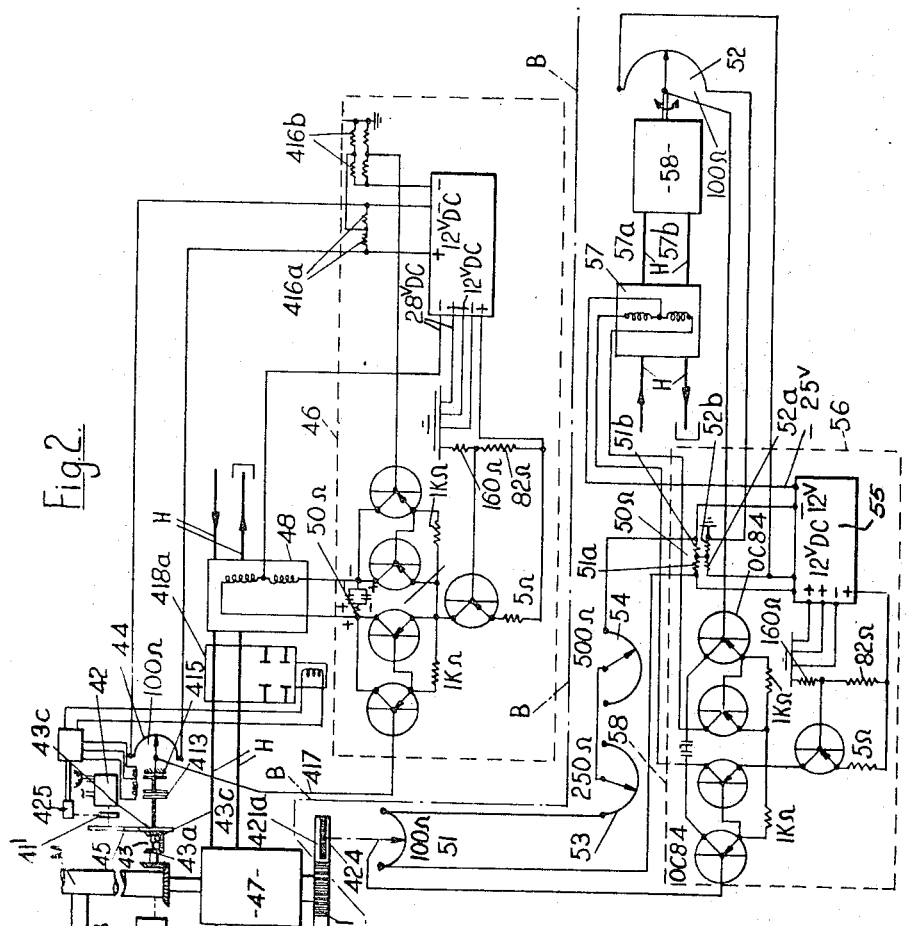

The present invention relates to training devices and has as an object an improved mechanism for use with a sailing simulator. A sailing simulator is an apparatus for teaching the art of sailing on dry land. The pupil sits in the apparatus and has the usual sailing controls to operate, namely a helm and a main sheet (which is a rope attached to the boom). In response to his operation of these controls, the apparatus swings around and heels over as in actual sailing. The response of the apparatus to the helm, and the angle of heeling, both depend upon the direction of supposed sailing relative to the imagined wind. By the main sheet, the pupil is able to move the boom, and the resistance to movement must depend upon such factors as the direction and strength of the imagined wind relative to the boom and the hull.

In a sailing simulator of the automatic type, in which the response of the helm and the angle of heel are controlled automatically to imitate natural conditions, it is necessary to provide the control mechanism, which may be mechanical, electromechanical or electronic, with a signal representing the angle of the boom and to provide boom actuating mechanism which gives the main sheet a natural feel and also causes the boom to swing as required besides providing an output which depends on the position of the boom. An object of the present invention is to provide mechanism for these purposes.

In accordance with the present invention, there is provided a boom controlling and sensing device for a sailing simulator which comprises an actuator, conveniently a hydraulic actuator, having a body mounted on the sailing simulator, conveniently upon a hull forming a part thereof, and means adapted to swing the boom, preferably by rotating a mast to which the boom is rigidly attached, e.g. by rotating a shaft attached to the mast, the body being mounted so as to be capable of rotation with the movement of the boom against the action of springs or other resilient means, the amount of rotation of the boom by the actuator being dependent on the transmission from an outside source of a signal representative of wind direction relative to the boom (or to the fore-and-aft axis of the hull of the simulator which is related to the direction of the boom) and a transmitter adapted to provide an output representing the angle through which the body has been rotated relative to the simulator.

Advantageously the actuator is driven via an amplifier system responsive to the setting of a potentiometer or other transducer, which setting depends upon the position of the boom and upon the signal representative of wind direction. In a preferred arrangement the transducer is driven by the output of a differential gear, the inputs of which are responsive to the position of the boom (normally the position of the actuator body) and the signal representative of wind direction.

The amplifier system in a convenient arrangement has a pair of similar amplifiers the outputs of which are arranged to drive the actuator in opposite directions, the input of one amplifier being derived from the transducer and the input of the other amplifier being derived from a reference circuit, the arrangement being such that the actuator is driven in such a direction as to cancel out any imbalance between the outputs of the amplifiers.

Figure 1:
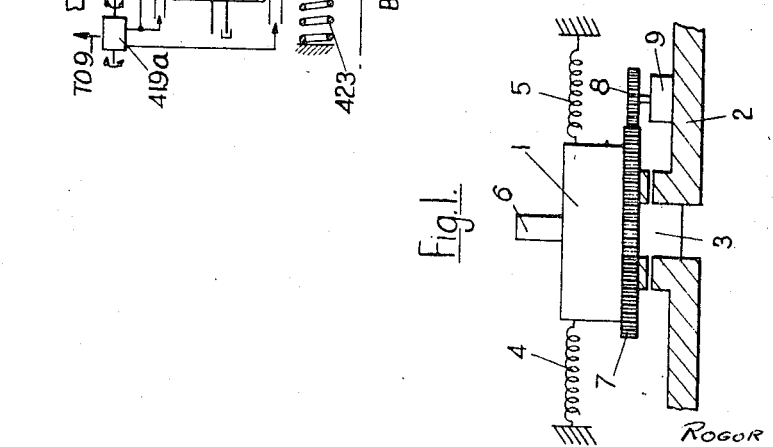

The following description, in which reference is made to the accompanying drawings is given in order to illustrate the invention. In the drawings: FIG. 1 shows a first form of boom positioning device, FIG. 2 shows a second form thereof with an operating circuit and FIG. 3 shows the manner in which the device of FIG. 2 is accommodated on a sailing simulator.

The body of a hydraulic positional actuator 1 is so mounted on the hull 2 of a sailing simulator as to be rotatable about an axle 3 against the action of springs 4 and 5. A shaft 6 of the actuator carries the mast (not shown) so as to rotate it. The body drives through gears 7 and 8 a transmitter 9, e.g. a hydraulic device, a rheostat or transformer, operable to provide an output signal from the device which represents the angle through which the mast, and therefore the boom carried thereby, have been rotated from the position corresponding with the direction of the wind.

The shaft 6 of the actuator 1 is moved by an electrical signal in a direction and by an amount which depend respectively on the polarity and the amplitude of the signal. The polarity and amplitude depend respectively on the side of the hull from which the wind is blowing and on the angle between the supposed wind direction and the fore-and-aft axis of the hull. If the boom were unrestrained, it would lie in the same direction as the wind, but the action of the helmsman in hauling-in the boom by the mainsheet causes the body 1 of the actuator to turn relative to the hull 2 against the action of the springs 4 and 5, the force in each being adjustable to correspond with the simulated wind force. Zero wind force is represented by lost motion, thus allowing the boom to assume any position without restraint. This drives the transmitter through the gears 7 and 8 to provide an output signal.

In the electrical arrangement shown in FIG. 2 the boom position part, i.e. the part above chain-dot line B, has a reversible hydraulic actuator 47 which rotates the mast M in either direction and so swings the boom B which is rigidly attached thereto. The angular position of the mast and boom are applied via bevel gearing to bevel pinion 43a forming part of a differential gear 43. A magslip receiver 42 driven by a star connection from a magslip transmitter 420 rotates the middle bevel pinion 43b of the differential. The output 43c from the differential drives a 100 ohm potentiometer 44 via an electric clutch 413 and an electric brake 415. The differential, magslip receiver and potentiometer and associated parts are mounted upon the actuator.

Magslip receiver 42 is supplied with a signal representing the supposed direction of the wind and is fed, for example, from the output of a device for determining said direction as described in our U.S. Pat. No. 3,457,783 (Ser. No. 639,377) said device driving magslip transmitter 420.

Potentiometer 44 is fed from a 12 volt D.C. power supply bridged by two 50 ohm resistors 416a in series, the position at which they connect together being joined to another pair of 50 ohm resistors 416b. In parallel with the resistors 416b is a second pair of 50 ohm resistors the interconnection of which is joined to the input of a D.C. amplifier system 46. This arrangement of resistors ensures that when the potentiometer 44 is in its central position, the signal supplied to the other input to the amplifier via line 417 is identical with the reference input from the said second pair of 50 ohm resistors.

The amplifier system 46 is in the form of two similar amplifiers and the two outputs are applied to an electrically controlled hydraulic servo valve 48 which passes hydraulic fluid in one direction or the other, which depends upon the position of the wiper of potentiometer 44 relative to its midpoint and so upon the degree and direction of imbalance of the amplifiers.

Connected across the outputs via a 50 ohm series resistance are two large electrolytic capacitors arranged in parallel with the negative pole of one connected with the positive pole of the other. This arrangement is superior to connecting the negative poles together and the positive poles together. The effect of the capacitors is to prevent unduly rapid movement of the boom.

Any imbalance results in the actuator 47, operated from a hydraulic supply via the servo valve 48, rotating the mast and boom until balance is restored by the differential 43 operating upon the potentiometer 44.

When the boom reaches the limit of its travel (in practice the shrouds supporting the mast M) a microswitch 425 operated by a cam 41′ releases the clutch 413 and applies the brake 415 and closes the solenoid valve 418a and via switch unit 419b, opens the valve 418b in a direction which holds the boom to port or starboard and movement of the boom ceases.

When the relative direction of the wind is such as to move the boom back to another position the microswitch 425 operated by the cam 41′ closes the clutch 413 and releases the brake 415, the valve 418b closes and 418a opens and allows the potentiometer 44 to signal the amplifier to cause the boom to follow in the reverse direction.

In order to simulate jibbing, i.e. moving the boom suddenly from one side to the other (in for example 0.5 second) the valve 418b is operated by a switch unit 419a, controlled via magslip receiver 42 star connected to magslip transmitter 420 by the wind resolver system described in our specification 639,377 which applies hydraulic pressure to the actuator 47, sending the boom rapidly across the hull. When the boom reaches its extreme position micro-switch 425 closes to maintain hydraulic pressure and prevent ready movement of the boom. The actuator 47 is mounted on bearings (not shown) and its casing bears a pinion 421 which engages a pair of racks carried by powerful springs. Only one rack 422 and one spring 423 are shown in the drawing. This arrangement allows the pupil to move the boom, as against the force of the wind, by rotating the entire actuator body.

The symbol H used in FIG. 2 represents hydraulic lines. They do not require special explanation.

If the boom were unrestrained by the pupil, it would lie in the same direction as the wind and in actual sailing there would be no forward driving force (unless the boom were arrested by the shrouds). It is the hauling on the boom by the pupil which sets the boom at an angle to the wind and so produces the required forward driving force.

The pinion 421 on the actuator body drives a second rack 421a and a pinion 424 which is employable for signalling the position of the boom to the potentiometer 51 of the computer part of the circuit shown below the chain-dot line B.

In the computer part of the circuit the angle of displacement of the boom from the position to which the wind would drive it naturally is sensed by the adjustment of a potentiometer 51 linked to the pinion 424 and the angle of heel is sensed similarly by a potentiometer 52. Rheostats 53 and 54 are set to represent the wind direction relative to the fore-and-aft line of the hull and the wind speed. The rheostat 53 is preferably adjusted automatically to correspond with changes in the relative direction as the hull rotates about its vertical axis, e.g. by a device as described in our copending application No. 639,377, whilst rheostat 54 may be left set at a constant value or adjusted to simulate changes of wind speed (by an instructor or by a programmed mechanism if provided) such as occur under natural, including gusty conditions. Rheostat 54 is so constructed that in the extreme position which represents no wind the circuit is broken. The output from the potentiometer 51, which is a signal representing the displacement of the boom relative to the position to which it would be driven naturally by the wind is fed to one input of a D.C. amplifier system 56 and the output from the potentiometer 52, which represents the heel angle, is fed to a second input to the amplifier. A power pack 55 feeds the amplifier system and the two potentiometers.

The D.C. amplifier system is a transistorized circuit constituted by two identical amplifiers one of which has its input connected with potentiometer 51 and the other of which has its input connected with a potentiometer 52. These inputs may diverge in either direction from the bias level depending upon whether the heeling is over port or over to starboard and whether the boom is displaced to port or starboard. The outputs of the amplifiers can be identical or either can be greater than the other. The outputs are fed to an electro-hydraulic servo valve 57 having two windings one for each amplifier and two hydraulic outputs 57a and 57b. Which of these outputs is turned on depends upon which of the outputs of the amplifiers is the greater. The hydraulic output is fed to a hydraulic heeling actuator 58 which adjusts the angle of heel and thence the potentiometer 52. The response of the device is thereby fed back to the amplifier system and the parameters of the circuit are so arranged that heeling stops when the appropriate angle is reached.

In order to prevent a violent heeling response, which in extreme cases would throw the pupil out of the hull two capacitors each of 2,000 μf., 25 volt electrolytic are connected in series, the two positive sides being joined across the outputs from the amplifier and a 10,000 μf. capacitor is connected across the D.C. supply to potentiometer 51.

The arrangement whereby the two electrolytic capacitors are connected in opposite directions (positive to positive rather than positive to negative) is found to give greatly improved results though no explanation for this phenomenon is offered. The capacitors are not damaged as the voltage across them is trivial.

The appropriate angle of heel depends, besides on the position of the boom, on the wind direction and wind speed. These variables, by adjusting the voltage input to the boom position potentiometer 51 by means of the rheostats 53 and 54, change the output from this potentiometer and therefore its input signal to the amplifier 56, thus modifying the output from the amplifier and so affecting the heel angle applied to the hull.

If the supposed wind speed is zero, rheostat 54 is set at its maximum resistance, i.e. infinite. Similarly the setting of rheostat 53 depends upon the wind direction and the output of the potentiometer 57 to the amplifier therefore depends upon both these factors.

If a supposed significant wind is dead ahead the boom should align itself with the wind and if the wind is dead astern the boom should lie across the fore-aft line of the hull against the shrouds and in neither case should heeling be obtained. Potentiometer 51 gives a neutral output, i.e. an output corresponding with the bias current to its input to the amplifier system. If there is an angle of heel at the time the boom is allowed to go free the outputs to the servo valve 57 operate the heeling actuator 58 and potentiometer 52 to bring the angle to zero.

If the wind is on the beam or at another angle which should result in heeling and the boom is pulled by the mainsheet into a position where heeling and forward motion should be obtained, the potentiometer 51 produces an output signal which affects the input to the corresponding part of the amplifier system and changes the output thereof in one direction or the other. The output is applied to the heeling actuator 58 via the servo valve 57 and fed back to the other input of the amplifier via potentiometer 52. The heeling actuator adjusts the angle of heel to the appropriate extent to equalise the two signals from the amplifier when the current angle of heel is reached.

The 50 ohm resistors 52a and 52b connected in series across potentiometer 52 and 50 ohm resistors 51a and 51b connected in series across the potentiometer 51 have their junction points connected directly together and thus maintained at the same potential. One side of the power supply to potentiometer 52 is grounded and the connection just mentioned prevents the power supply to rheostats 53 and 54 and potentiometer 51 from floating and producing spurious results.

If desired, the transistorised amplifiers described hereinbefore may be replaced by vacuum tube or hybrid amplifiers or instead of providing rheostats, potentiometers and electronic amplifiers, their fluid equivalents (fluid-logic circuits) may be used. The fluid equivalents lead to little complication, as hydraulic lines, from which the fluid may be derived, are present in any case.

It will be understood that a mechanical boom positioner device can be employed with an electronic or fluid-logic computer device or vice-versa if desired.

FIG. 3 shows diagrammatically a sailing simulator having a hull 61 rotatable in the horizontal plane about an axis 62 by a tiller 63 connected with a rudder 64 through the medium of a turning motor 65 and a gear box 66 which rotates about a heavy duty shaft 67 secured to a base 68 which rests on the floor 69 of a suitable building.

The hull is also rotatable for a heeling movement about an axis 70 of a shaft 71 driven by gearing 72. The electronic heeling control of FIG. 2 is positioned at 73 and the electronic boom control of FIG. 2 is positioned at 74. Power packs for these electronic controls are located at 74' and 75.

Reference 76 shows a stern sheet which runs through pulley 77 on the boom.

Parts shown also in FIG. 3 are denoted by the same reference numerals or letters as are shown in FIG. 2. A wind resolver direction transducer is shown at 78. Within the gear box 66 is a unit for feeding the direction of the supposed wind (which changes as the hull rotates about axis 62) to the rheostat 53. The unit 79 is a device for setting the wind speed, which may be a simple hand control or a programmed device for simulating gusty conditions.

80 is a potentiometer actuated by the tiller for controlling the motor 65.

The parts below the hull 61 are enclosed by suitable panelling. Obviously various layouts other than that shown may be employed if desired.

We claim:

1. A boom controlling and sensing device for a sailing simulator, said simulator having a hull and a boom swingably mounted upon the hull for swinging movement across the hull through a path leading from port to starboard, said device comprising an actuator arranged for swinging the boom across the hull to any set position on said path, said actuator being rotatably mounted on the simulator and being rotatable as a unit together with the boom to swing the boom from its set position, resilient means opposing the rotation of the actuator and therefore opposing swinging of the boom from its set position, externally powered reversible actuator driving means for driving the actuator, and thence driving the boom to its set positions, and, connected with the actuator a transmitter adapted to provide an output signal representing the angle through which the actuator has been rotated against the opposition of the resilient means relative to the simulator and therefor representing the amount of swing of the boom from its set position determined by the driving means.

2. A device according to claim 1 in which the actuator is a hydraulic motor.

3. A device according to claim 1 in which the simulator has a mast mounted for rotation relative to the hull, the boom is rigidly attached to the mast for the swinging of the boom, and the actuator is arranged to swing the boom by rotating the mast.

4. A device according to claim 1 having a rack operated by the body of the actuator and a pinion rotatable by the rack and the transmitter is a potentiometer driven by the pinion the setting of said potentiometer determining said output signal.

5. A device according to claim 1 provided with a signal receiver having a mechanical output representative of supposed wind direction, a differential gear having two inputs and one output, and an error transducer, said gear, signal receiver and error transducer being mounted for rotation with the actuator and boom rotatable unit, and one input of the differential gear is responsive to swinging movement of the boom relative to, and produced by, the actuator and the other input is responsive to the mechanical output of the signal receiver so that the error transducer is supplied with a signal representing any deviation of the said set position from the supposed wind direction, said error transducer being connected via an amplifiers system to the powered reversible actuator driving means to operate said means to reduce said deviation signal.

6. A device according to claim 5 having a reference circuit to provide a constant reference signal, in which device the amplifier system has a pair of similar amplifiers the outputs of which are arranged to operate the powered reversible actuator driving means in opposite directions the input of one of the said amplifiers being derived from the error transducer and the input of the other of the said amplifiers being derived from the reference circuit, the arrangement being such that the actuator is driven in such a direction as to cancel out any imbalance between the outputs of the amplifiers.

References Cited

UNITED STATES PATENTS

| | | | |
|---|---|---|---|
| 2,208,083 | 7/1940 | Rousseau | 35—11 |
| 2,855,702 | 10/1958 | Taylor | 35—11 |
| 3,305,943 | 2/1967 | Hansen | 35—11 |

WILLIAM H. GRIEB, Primary Examiner